United States Patent
Rhodes et al.

[11] Patent Number: 6,154,449
[45] Date of Patent: Nov. 28, 2000

[54] SWITCHLESS NETWORK

[75] Inventors: Steven James Rhodes; Michael A. Gazier, both of Nepean, Canada

[73] Assignee: Northern Telecom Limited, Montreal, Canada

[21] Appl. No.: 08/997,569

[22] Filed: Dec. 23, 1997

[51] Int. Cl.[7] .......................... H04L 12/28; H04L 12/50; H04Q 11/00
[52] U.S. Cl. ............................................ 370/254; 370/386
[58] Field of Search ..................... 370/423, 424, 370/427, 351, 356, 386, 388, 397, 254

[56] References Cited

U.S. PATENT DOCUMENTS

| | | |
|---|---|---|
| 5,491,694 | 2/1996 | Oliver et al. ........................... 370/85.4 |
| 5,521,910 | 5/1996 | Matthews ................................. 370/54 |
| 5,751,710 | 5/1998 | Crowther et al ........................ 370/423 |
| 5,790,546 | 8/1998 | Dobbins et al. ........................ 370/400 |

*Primary Examiner*—Alpus H. Hsu
*Assistant Examiner*—Duc Ho
*Attorney, Agent, or Firm*—Cobrin & Gittes

[57] ABSTRACT

A network shelf is disclosed for connecting a number of devices together. The shelf includes a backplane having multiple device slots. It also includes multiple links connected to each device slot. Each of the device slots is normally connected to at least one of the other device slots through at least one of the links. The limit on the number of devices being connected together in a full mesh configuration is one more than the number of links on a given device slot.

28 Claims, 2 Drawing Sheets

SWITCHLESS NETWORK

FIELD OF THE INVENTION

The invention relates generally to the field of circuit switching and more particularly, to a system of providing communication paths between multiple devices with multiple links connected to each device.

BACKGROUND OF THE INVENTION

In telephone networks, computer networks, etc., many devices communicate with many other devices. Due to the large number of possible combinations of devices which may communicate with each other, it is generally considered impractical and inefficient to dedicate unique physical communication links to each pair of network devices. Instead, switches logically configure communication links between all devices with physical links being located only between the switch and each device.

While these switches are very efficient and practical for large scale networks, they are costly, consume power and take up valuable space in smaller networks.

As such, the need exists for an inexpensive device, which is smaller than a switch, consumes less power than a switch, but can provide the same results as a switch for a limited number of devices.

It is accordingly an object of the present invention to provide a module of dedicated communication links.

It is another object of the present invention to provide such a module which connects to a backplane in a slot which is reserved for a switch.

It is still another object of the invention to provide such a module for use with an Asynchronous Transfer Module (ATM) network.

It is another object of the invention to provide such a module for a limited number of devices.

It is still another object of the invention to provide such a module which does not require power from the system to operate.

These and other objects of the invention will become apparent to those skilled in the art from the following description thereof.

SUMMARY OF THE INVENTION

It has now been discovered that these and other objects may be accomplished by the present apparatus for and a method of providing communication paths between network devices.

According to one embodiment, the invention includes a network shelf which includes a backplane having multiple device ports. It further includes multiple links connected to each of the device ports. Each of the device ports may be connected to at least one other device port through at least one of the links. The total number of device slots coupled together in a full mesh configuration should be no greater than one more than a total number of the links connected to one of the device ports. That number could be greater for a partial mesh configuration.

In another embodiment, the invention includes a method of providing communication paths between multiple devices selectively connected to a network shelf. The shelf may include a backplane having multiple device ports and multiple links connected to each of the device ports. The number of device ports connected together in a full mesh configuration should be no more than, one more than the number of links connected to one of the device ports. This embodiment provides a unique, dedicated communication link between at least a first device port and a second device port.

According to another embodiment, the invention includes a switchless network including multiple devices each having multiple link interfaces. The total number of devices in a full mesh configuration should be less than or equal to one more than the total number of link interfaces on one of the devices. This embodiment also includes multiple communication links which may statically (but optionally reconfigurably) interconnect each of the devices to one or more of the other devices. The communication links are connected between the link interfaces.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and accompanying drawings, in which.

DETAILED DESCRIPTION OF THE INVENTION

Figure 1:
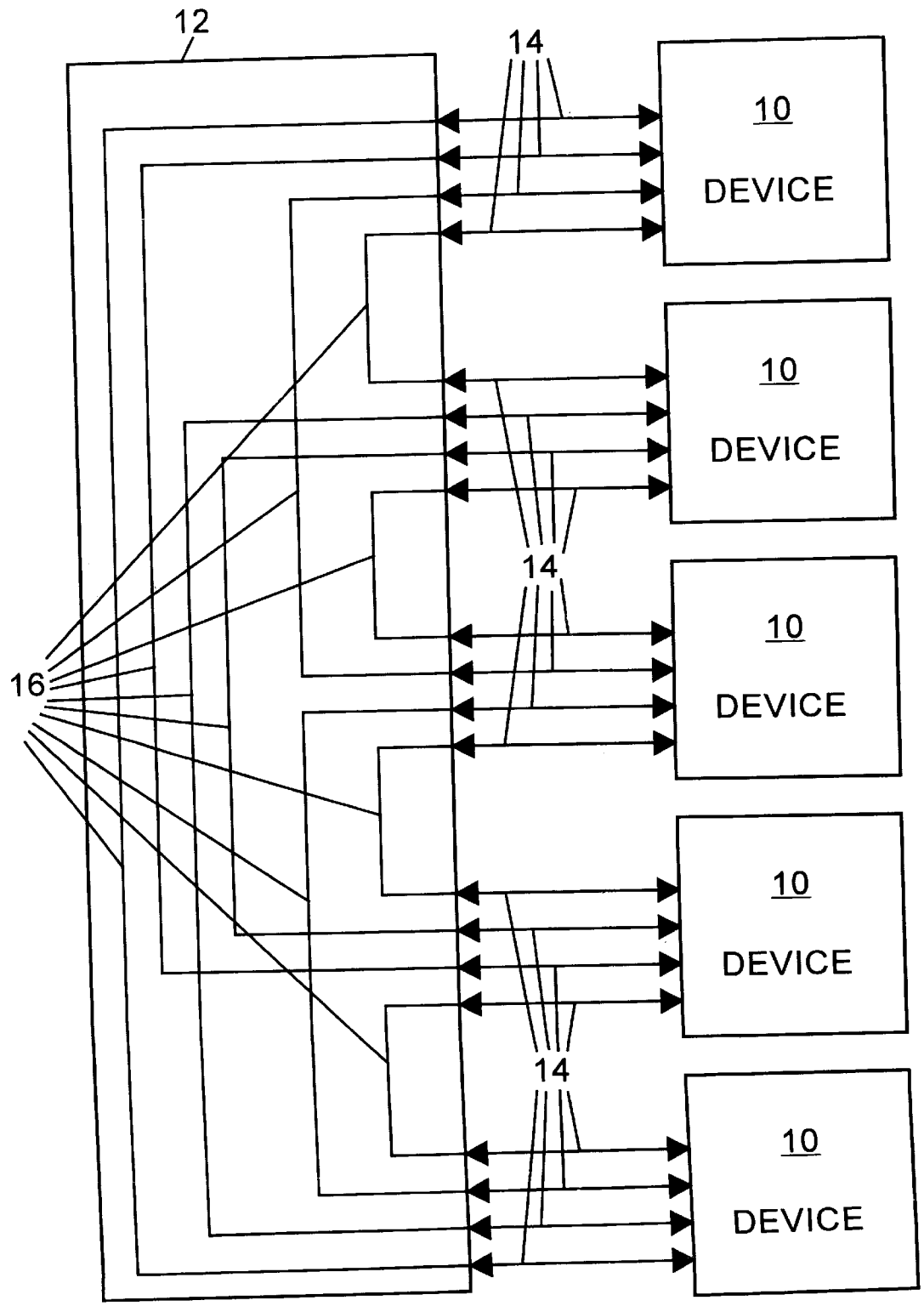
FIG. 1 is a block diagram depicting multiple devices connected in accordance with the invention; showing details of a fully interconnected mesh.

FIG. 1 conceptually illustrates multiple devices 10 fully interconnected in accordance with the invention. FIG. 1 illustrates five devices 10 connected together by dedicated links 14 and 16. Those skilled in the art will recognize that different links 14 and/or 16 may support different bandwidths. Each of the devices 10 has the ability to communicate with each of the other devices 10 and is connected to the network by four links 14. While the embodiment illustrated in FIG. 1 depicts five devices 10 each having four links 14, one skilled in the art will recognize that this system can be applied to networks configured for more than five devices 10 or fewer than five devices 10, and that each of the devices 10 may have fewer than four links 14, four links 14, or more than four links 14. Additionally, FIG. 1 illustrates a "full mesh" wherein every device 10 may directly communicate with every other device 10. It is also possible to configure the system as a "partial mesh" (i.e. FIG. 2), wherein certain devices 10 are not given the ability to communicate directly with other devices 10.

Figure 2:
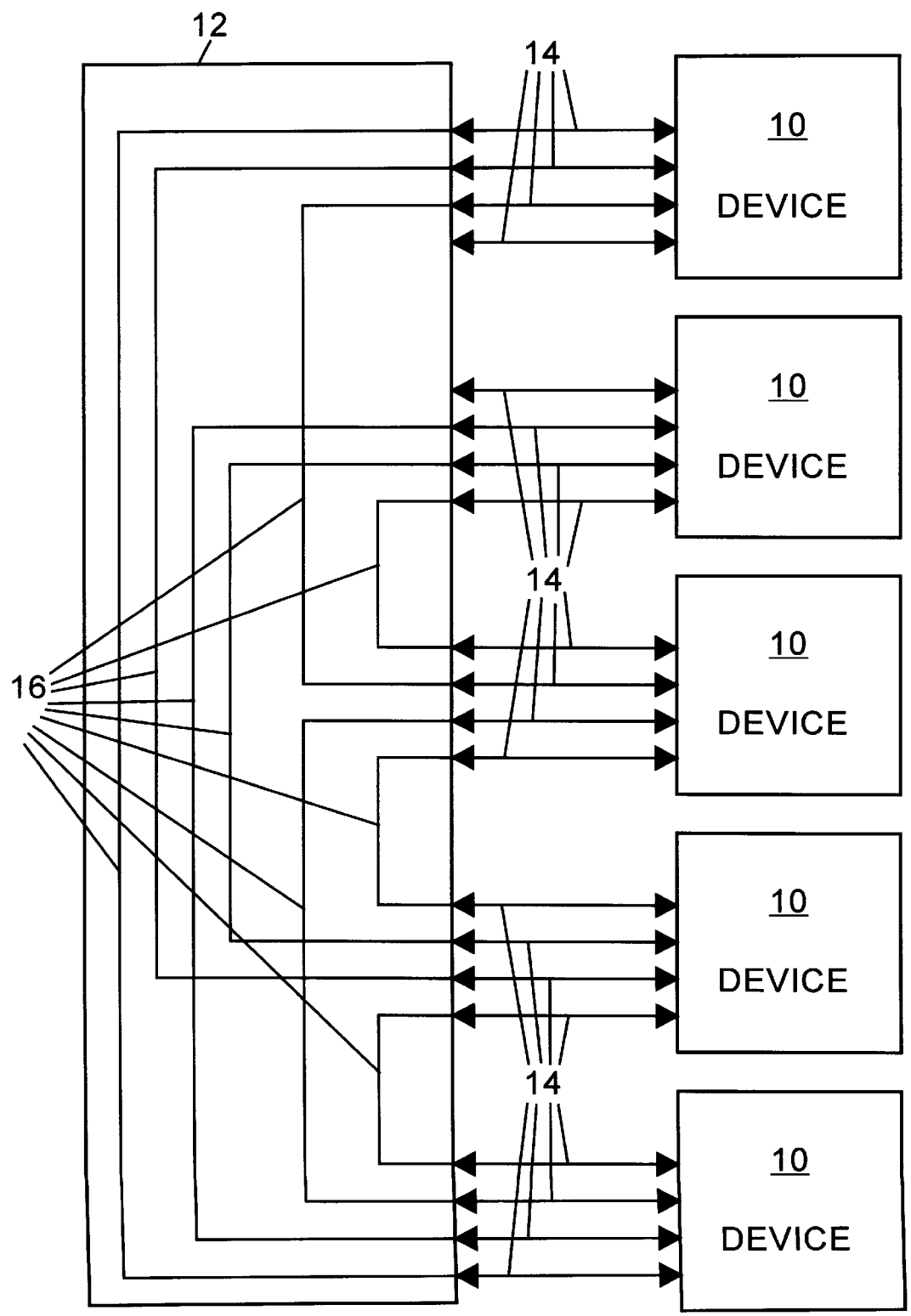
FIG. 2 is a block diagram of the invention depicting multiple devices connected in accordance with the invention; showing details of a partially interconnected mesh.

FIG. 2 illustrates a system similar to the system illustrated in FIG. 1, wherein two devices 10 are not given the ability to directly communicate with each other. Those skilled in the art, will recognize that the number of devices 10 which can not directly communicate with each other may be greater than two. In the configuration illustrated in FIG. 2, it is possible that the devices 10 may each have different numbers of links 14 (not shown) or that the devices 10 may have the same number of links 14, but with some of the links not being utilized (as shown in FIG. 2).

It has been determined that it is more economical and more efficient to utilize the configuration of the present invention when the number of devices 10 to be connected is less than or equal to one more than the number of links 14 on one device 10. Thus, with a backplane having M device slots to be employed by a network of devices, with M being a number greater than or equal to one, and each of the M device slots has N possible links 14, with N being a number greater than one, it has been determined that it is more economical and efficient to employ the present invention instead of a switch if M≦N+1. It has also been determined that the present invention may be utilized for telephone networks, computer networks, combinations thereof and any other networks which require multiple devices 10 to communicate with each other (i.e. network hubs, network workstations, switches, Asynchronous Transfer Module-25 ("ATM-25"), low speed ATMs, cluster controllers, telephones, different telephony devices or the like). Various configurations of the present invention are possible which may provide different qualities of service. One such configuration is depicted in FIG. 2. FIG. 2 shows a configuration wherein the system does not provide a full mesh connection scheme between all of the devices 10. Thus certain devices 10 are not able to directly communicate with certain other devices 10. Another such configuration could provide different links 16, having different bandwidths, to different devices 10. Further, these configurations could be combined, thus providing a partial mesh with different bandwidth allocations. Further still, some links could have a higher priority associated therewith while others have a lower priority associated therewith. While these methods have been disclosed, they are not meant to limit the present invention to any of these systems. The present invention will also work with no differentiation in quality of service, with other quality of service techniques such as providing different time slots for communication or other conventional quality of service techniques.

One embodiment of the present invention may be implemented on a conventional network shelf (i.e. an ATM shelf. While an ATM shelf has been disclosed, it is not meant to be limiting in any way, the invention may be utilized on any other conventional shelf as well) (not shown). The network shelf may be used to support all or some of the devices 10. The network shelf may also include a conventional backplane (not shown), which has multiple device ports. Since most conventional backplanes include at least one slot for a switch, a routing module 12 could replace the switch. In such a configuration, the routing module could have dedicated links 16 for providing dedicated communication paths between all or some of the devices 10.

Another embodiment of the present invention may also be implemented on a conventional network shelf (not shown). The network shelf may be used to support all or some of the devices 10. The network shelf may also include a backplane 12 which has multiple device ports wherein all or some of the device ports have dedicated communication paths (links) 14/16 therebetween. In such a configuration, it is unnecessary to include a port for a switch, although having one would not detract from the invention.

It will thus be seen that the invention efficiently attains the objects set forth above, among those made apparent from the preceding description. In particular, the invention provides a switchless network. Those skilled in the art will appreciate that the configurations depicted in FIGS. 1 and 2 enable small numbers of devices to communicate efficiently and effectively.

It will be understood that changes may be made in the above construction and in the foregoing sequences of operation without departing from the scope of the invention. For example, those skilled in the art will recognize that not all of the ports on a backplane need to be involved in this dedicated connection scheme. It is possible to have a backplane which only provides dedicated communication paths between certain of its device ports, while the remaining device ports are connected to a conventional switch. If a redundancy of links is desired, it is also possible that traffic may be routed through a second routing module to the destination module in case of a direct link failure. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A switchless network comprising:
   a backplane having a plurality of device slots; and
   a plurality of links each coupled to at least a respective two of said plurality of device slots such that each of said plurality of device slots is connected to at least one other of said plurality of device slots through at least one of said plurality of links; a total number of said plurality of device slots coupled together being at most one more than a total number of said plurality of links coupled to a respective one of said plurality of device slots; wherein the number of device slots is greater than two and a bandwidth associated with at least a respective one of said links being different than a bandwidth associated with at least another of said plurality of links.

2. The switchless network claimed in claim 1 further comprising:
   a routing module coupled to said backplane, wherein at least one of said plurality of links which is coupled to each of said at least two of said plurality of device slots is coupled to said routing module; and, wherein said routing module comprises:
   a plurality of dedicated links statically coupling said at least two of said plurality of device slots together.

3. The switchless network claimed in claim 2 wherein said plurality of dedicated links statically couple each of said plurality of device slots to each of a remainder of said plurality of device slots.

4. The switchless network as claimed in claim 1 wherein each of said plurality of device slots is statically coupled to each of a remainder of said plurality of device slots.

5. The switchless network as claimed in claim 1 wherein each of said plurality of device slots is dynamically coupled to each of a remainder of said plurality of device slots.

6. A method of providing communication paths between a plurality of devices selectively connected to a network shelf, said network shelf comprising a backplane having a plurality of device slots and having a plurality of links each coupled to at least a respective two of said plurality of device slots, said method comprising:
   limiting a total number of said plurality of device slots coupled together to at most one more than a total number of said links coupled to one of said plurality of device slots wherein the number of the devices is greater than two;
   providing a unique, dedicated communication link between at least a first one and second one of said plurality of device slots; and
   providing a bandwidth that is associated with at least a respective one of said links that is different than a bandwidth that is associated with at least another of said plurality of links.

7. The method of providing communication paths as claimed in claim 6 further comprising:

providing a unique, dedicated communication link between at least a first of said plurality of device slots and a remainder of said plurality of device slots.

8. The method of providing a communication path as claimed in claim 6 further comprising:

providing a unique dedicated communication link between each of said plurality of device slots and each of a remainder of said plurality of device slots.

9. A switchless network comprising:

a plurality of devices each having a respective plurality of link interfaces, a total number of said plurality of devices being at most one more than a total number of said plurality of link interfaces of a respective one of said plurality of devices wherein the number of the device slots is greater than two; and a plurality of communication links statically interconnecting each of said plurality of devices to at least one of a remainder of said plurality of devices, each of said plurality of communication links being coupled between a respective one of said plurality of link interfaces of said each device and a respective one of said plurality of communication links of said at least one of said remainder of said plurality of devices; and a bandwidth associated with at least a respective one of said communication links being different than a bandwidth associated with at least another of said plurality of communication links.

10. The switchless network claimed in claim 9 further comprising:

a backplane, and a module coupled to said backplane, wherein at least one of said plurality of communication links is located within said module.

11. The switchless network claimed in claim 10 wherein all of said plurality of communication links are located within said module.

12. The switchless network claimed in claim 10 further comprising:

a network shelf;

at least one of said plurality of devices being supported by said network shelf; and, said backplane being coupled to said network shelf.

13. The switchless network as claimed in claim 10 further comprising:

a second module configured exactly as said routing module and coupled to said backplane, wherein said at least one of said plurality of links which is coupled to said routing module is also coupled to said second routing module;

wherein said second module connects the same device slots as said routing module.

14. The switchless network as claimed in claim 9 wherein said plurality of communication links statically interconnect each of said plurality of devices to each of said remainder of said plurality of devices.

15. A switchless network comprising:

a backplane having a plurality of device slots; and a plurality of links each coupled to at least a respective two of said plurality of device slots such that each of said plurality of device slots is connected to at least one other of said plurality of device slots through at least one of said plurality of links; a total number of said plurality of device slots coupled together being at most one more than a total number of said plurality of links coupled to a respective one of said plurality of device slots wherein the number of the device slots is greater than two; and a priority associated with at least a respective one of said links being greater than a priority associated with at least another of said plurality of links.

16. The switchless network of claim 15 further comprising:

a routing module coupled to said backplane, wherein at least one of said plurality of links which is coupled to each of said at least two of said plurality of device slots is coupled to said routing module; and, wherein said routing module comprises:

a plurality of dedicated links statically coupling said at least two of said plurality of device slots together.

17. The switchless network of claim 16 wherein said plurality of dedicated links statically couple each of said plurality of device slots to each of a remainder of said plurality of device slots.

18. The switchless network of claim 15 wherein each of said plurality of device slots is statically coupled to each of a remainder of said plurality of device slots.

19. The switchless network of claim 15 wherein each of said plurality of device slots is dynamically coupled to each of a remainder of said plurality of device slots.

20. A method of providing communication paths between a plurality of devices selectively connected to a network shelf, said network shelf comprising a backplane having a plurality of device slots and having a plurality of links each coupled to at least a respective two of said plurality of device slots, said method comprising:

limiting a total number of said plurality of device slots coupled together at most one more than a total number of said links coupled to one of said plurality of device slots wherein the number of the device slots is greater than two;

providing a unique, dedicated communication link between at least a first one and second one of said plurality of device slots; and providing a priority that is associated with at least a respective one of said links that is greater than a priority that is associated with at least another of said plurality of links.

21. The method of claim 20 further comprising:

providing a unique, dedicated communication link between at least a first of said plurality of device slots and a remainder of said plurality of device slots.

22. The method of claim 20 further comprising:

providing a unique, dedicated communication link between each of said plurality of device slots and each of a remainder of said plurality of device slots.

23. A switchless network comprising:

a plurality of devices each having a respective plurality of link interfaces, a total number of said plurality of devices being at most one more than a total number of said plurality of link interfaces of a respective one of said plurality of devices wherein the number of the devices is greater than two; and a plurality of communication links statically interconnecting each of said plurality of devices to at least one of a remainder of said plurality of devices, each of said plurality of communication links being coupled between a respective one of said plurality of link interfaces of said each device and a respective one of said plurality of communication links of said at least one of said remainder of said plurality of devices; and a priority associated with at least a respective one of said communication links being greater than a priority associated with at least another of said plurality of communication links.

24. The switchless network of claim 23 further comprising:

a backplane; and a module coupled to said backplane, wherein at least one of said plurality of communication links is located within said module.

25. The switchless network of claim 24 wherein all of said plurality of communication links are located within said module.

26. The switchless network of claim 24 further comprising:

a network shelf; and at least one of said plurality of devices being supported by said network shelf;

said backplane being coupled to said network shelf.

27. The switchless network of claim 24 further comprising:

a second module configured exactly as said routing module and coupled to said backplane, wherein said at least one of said plurality of links which is coupled to said routing module is also coupled to said second routing module;

wherein said second module connects the same device slots as said routing module.

28. The switchless network of claim 23 wherein said plurality of communication links statically interconnect each of said plurality of devices to each of said remainder of said plurality of devices.

* * * * *